Dec. 19, 1972   N. R. HENRY   3,706,587
AUTOMATIC FILLING AND WEIGHING APPARATUS
Filed Dec. 24, 1970   7 Sheets-Sheet 1

INVENTOR.
NELSON R. HENRY
BY
Newton, Hopkins, & Ormsby
ATTORNEYS

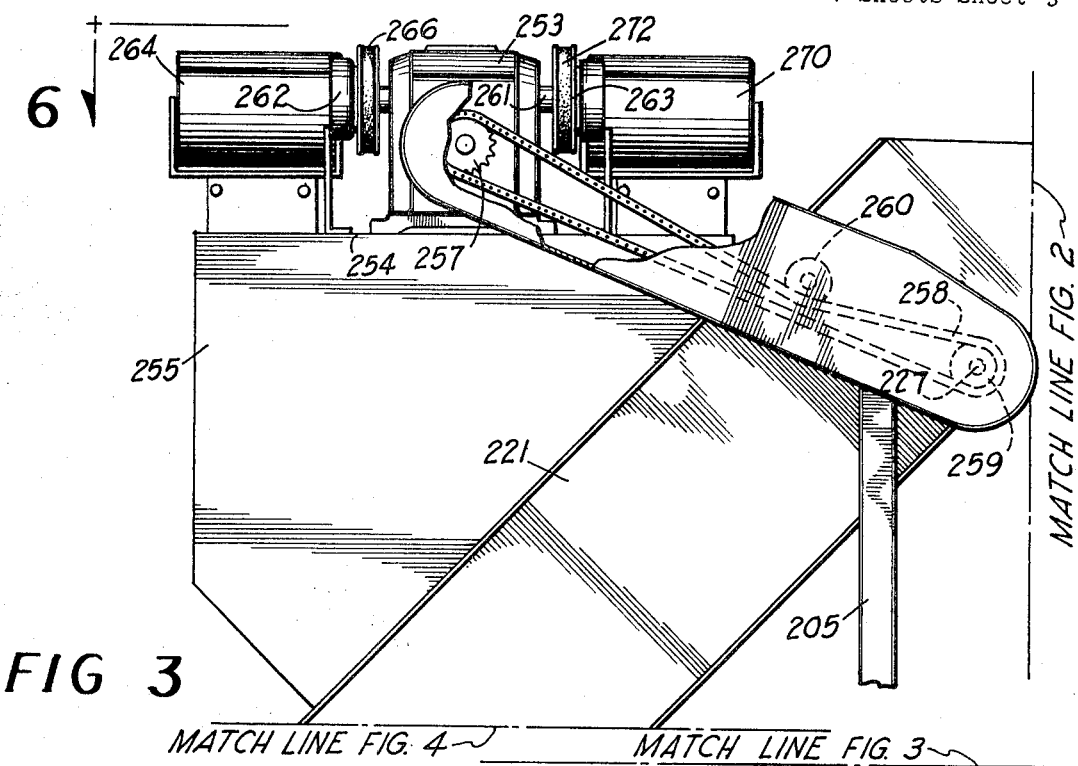
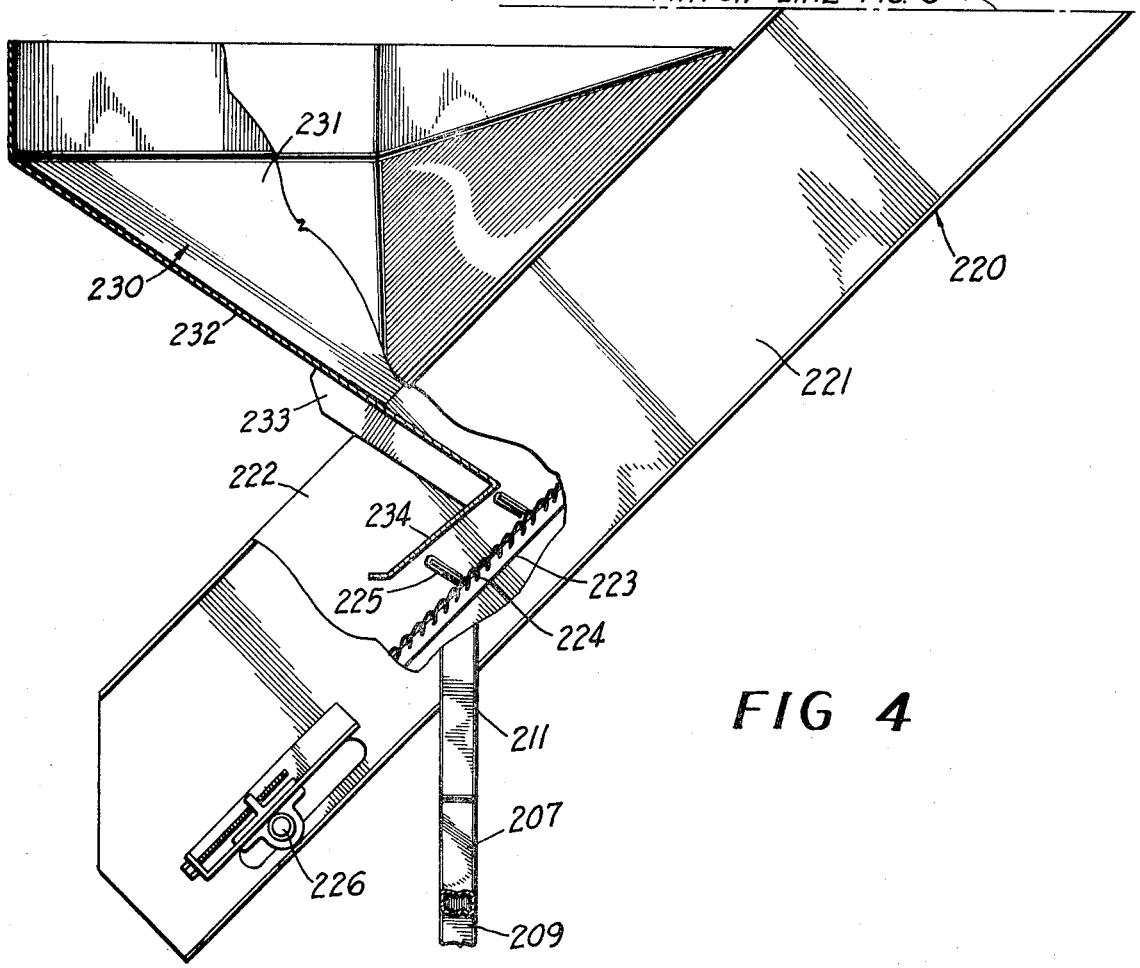

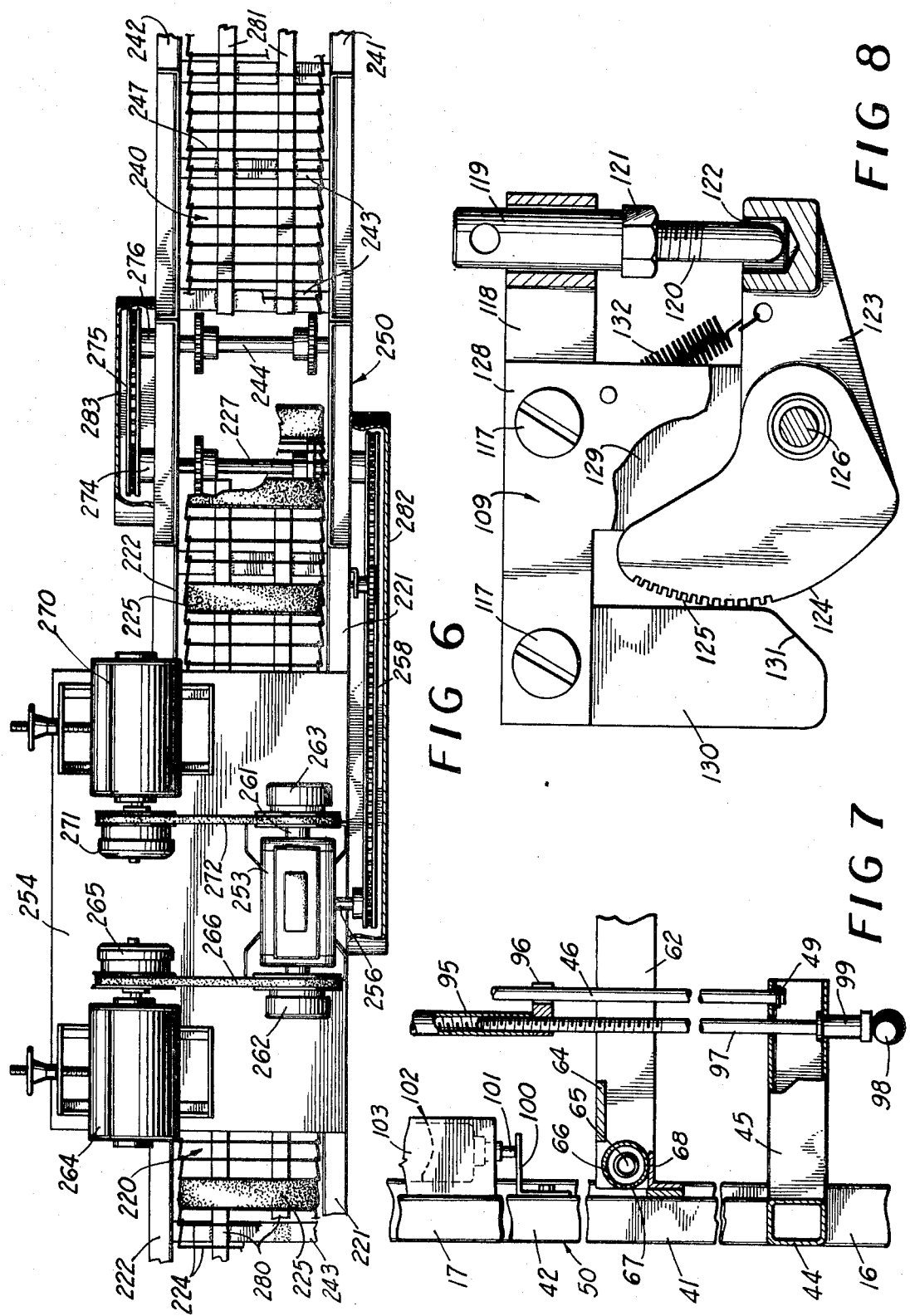

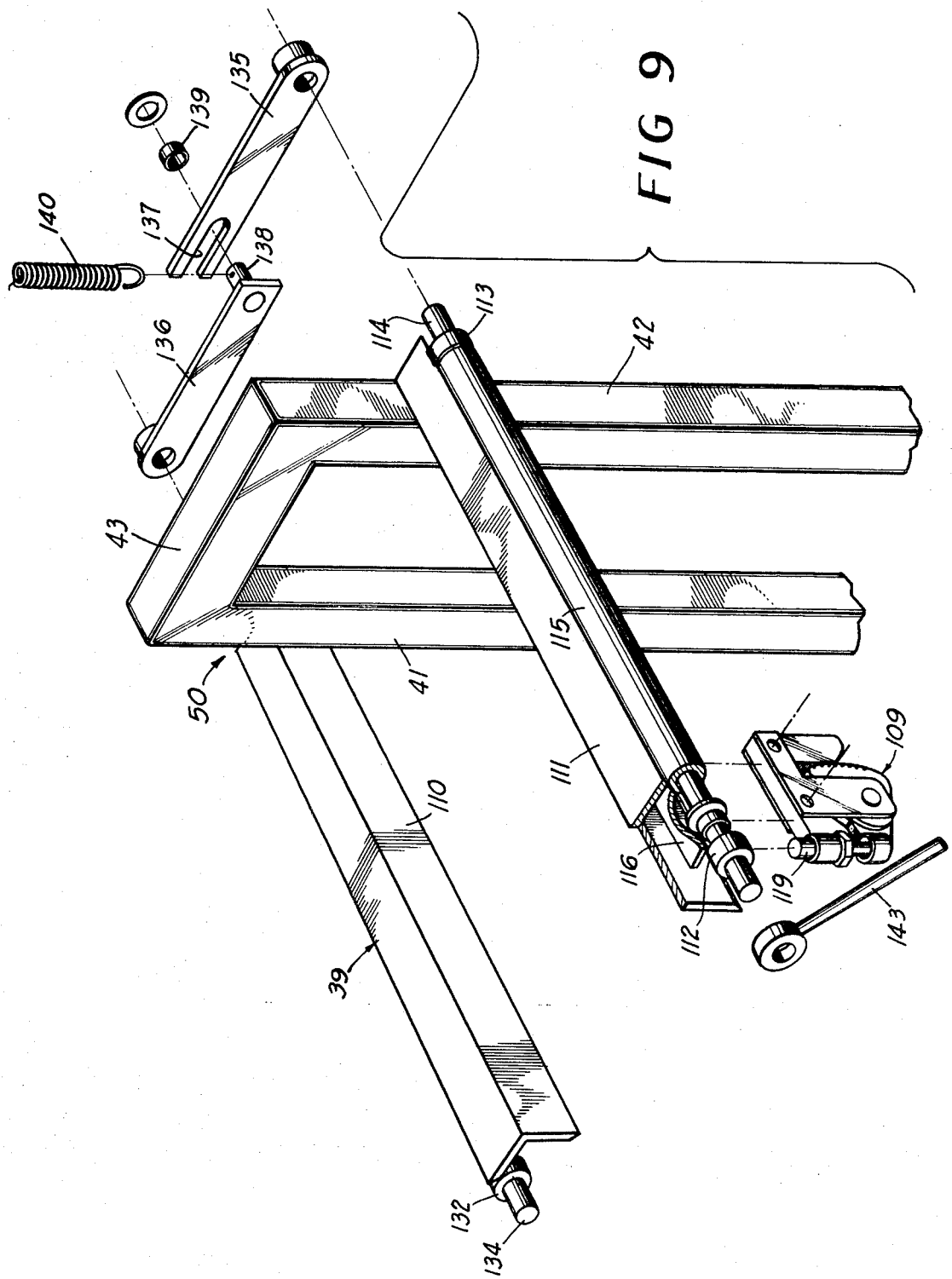

United States Patent Office 3,706,587
Patented Dec. 19, 1972

3,706,587
AUTOMATIC FILLING AND WEIGHING
APPARATUS
Nelson R. Henry, 583 Willivee Drive,
Decatur, Ga. 30033
Filed Dec. 24, 1970, Ser. No. 101,269
Int. Cl. G01g 13/02
U.S. Cl. 177—1            12 Claims

ABSTRACT OF THE DISCLOSURE

Automatic filling and weighing mechanism having a weighing station with support for suspending a manually installed receptacle, such as a bag, in a fixed position, in combination with a conveyor and drive mechanism for driving the conveyor at two different prescribed speeds; namely, a relatively high bulk filling speed. One of the two weighing mechanisms determines when the receptacle is substantially filled with articles fed from the conveyor and the other weighing mechanism determines when the receptacle is completely filled to a prescribed weight. A control mechanism in combination with the first weighing mechanism causes a shifting of the conveyor from high speed to low speed. When the prescribed weight for the receptacle has been achieved a control, associated with the second weighing mechanism, automatically stops the conveyor. When the conveyor is stopped the bag is manually removed. A foot actuated control switch determines when the conveyor is again actuated.

BRIEF SUMMARY OF THE INVENTION

This invention relates to an automatic filling and weighing mechanism and is more particularly concerned with a bagging machine which will automatically fill and weigh successive receptacles or bags disposed in a weighing station.

In the past, potatoes, onions, nuts, citrus fruits, and perhaps other vegetables and produce have been packaged in fifty pound and 100 pound burlap sacks. At times, larger paper bags or plastic bags have been used in place of the burlap sacks. The mechanism conventionally used, for filling such relatively large receptacles, has been a conveyor having deflecting blades which direct the products to spaced gates, at which operators are stationed. The operator at each gate raises the gate to discharge the products into a bag mechanically held in place. Thereafter, the bag is manually transferred to a weighing station where sufficient products are added or removed from the bag to make up the proper weight.

U.S. Pats. No. 3,057,382, No. 2,634,085 and No. 1,861,443, discloses still other types of filling and weighing mechanisms.

Briefly described, the automatic filling and weighing mechanism, of the present invention, which fits the needs of small operations, includes an upright main frame carrying a weighing frame. The weighing frame includes parallelogram arrangement within the frame which will permit limited vertical movement of a pair of cantilever supported arms which are provided with cams for receiving and retaining a bag in a position to receive articles. On the frame is a scale balance or other mechanism for accurately weighing the parallelogram frame as well as the bag retained thereby. There is also a primary weighing mechanism which bulk weighs substantially the entire prescribed weight for the receptacle. Both weighing mechanisms are adjustable so that prescribed amounts of weight may be set thereon.

In conjunction with the weighing station is a conveyor mechanism which feeds articles, such as potatoes along a prescribed path and into the receptacle. This conveyor mechanism has two motors selectively engageable with a clutch so that either one or the other motor drives the conveyor. When one motor drives the conveyor, the conveyor feeds quite rapidly a bulk amount of the articles to the receptacle. When the other motor drives the conveyor, only a dribble amount of articles are fed to the receptacle. The weighing mechanism determines when a selected motor is driving the conveyor and when neither motor is driving the conveyor.

Accordingly, it is an object of the present invention to provide a practical and durable automatic filling and weighing mechanism for filling and weighing large bags, sacks, and other receptacles with a minimum of supervision and manual labor.

Another object of the present invention is to provide an automatic filling and weighing mechanism which will operate automatically and is independent of the skill of the operator in both filling and weighing successive receptacles.

Another object of the present invention is to provide an automatic filling and weighing mechanism which will automatically rapidly fill and accurately weigh successive receptacles in a zone.

Another object of the present invention is to provide an automatic filling and weighing mechanism which is inexpensive to manufacture, durable in structure, and efficient in operation.

Another object of the present invention is to provide an automatic filling and weighing mechanism which will rapidly fill with a bulk amount of articles, a receptacle and then gradually add to this bulk amount, sufficient articles to supply a prescribed weight of articles to the receptacle.

Another object of the present invention is to provide an automatic filling and weighing mechanism in which the bags are readily and easily installed for filling and readily removed after the same have been filled and weighed.

Another object of the present invention is to provide an automatic filling and weighing mechanism which requires only a single operator to control the same.

Another object of the present invention is to provide an automatic filling and weighing mechanism in which the amount of the prescribed weight to be filled into successive receptacles can be readily and easily changed and incrementally adjusted.

Other objects, features and advantages of the present invention will become apparent from the following description when taken in conjunction with the accompanying drawings wherein like character of reference designate corresponding parts through the several views.

BRIEF DESCRIPTION OF THE DRAWINGS

FIG. 3 is an enlarged partially broken away side elevational view of the central portion of the conveyor mechanism disclosed in FIG. 1;

FIG. 4 is a side elevational view partially broken away, of the hopper or intake end of the conveyor mechanism disclosed in FIG. 1;

FIG. 6 is a cross-sectional view taken substantially along line 6—6 in FIGS. 2 and 3;

FIG. 7 is a vertical sectional view taken substantially along line 7—7 in FIG. 2;

FIG. 8 is a enlarged side elevational view, partially broken away showing one of the receptacle retaining grippers of the bag supporting frame of the mechanism disclosed in FIG. 1;

FIG. 9 is an enlarged fragmentary exploded perspective view of the bag supporting frame of the mechanism shown in FIG. 1.

DETAILED DESCRIPTION

Figure 1:
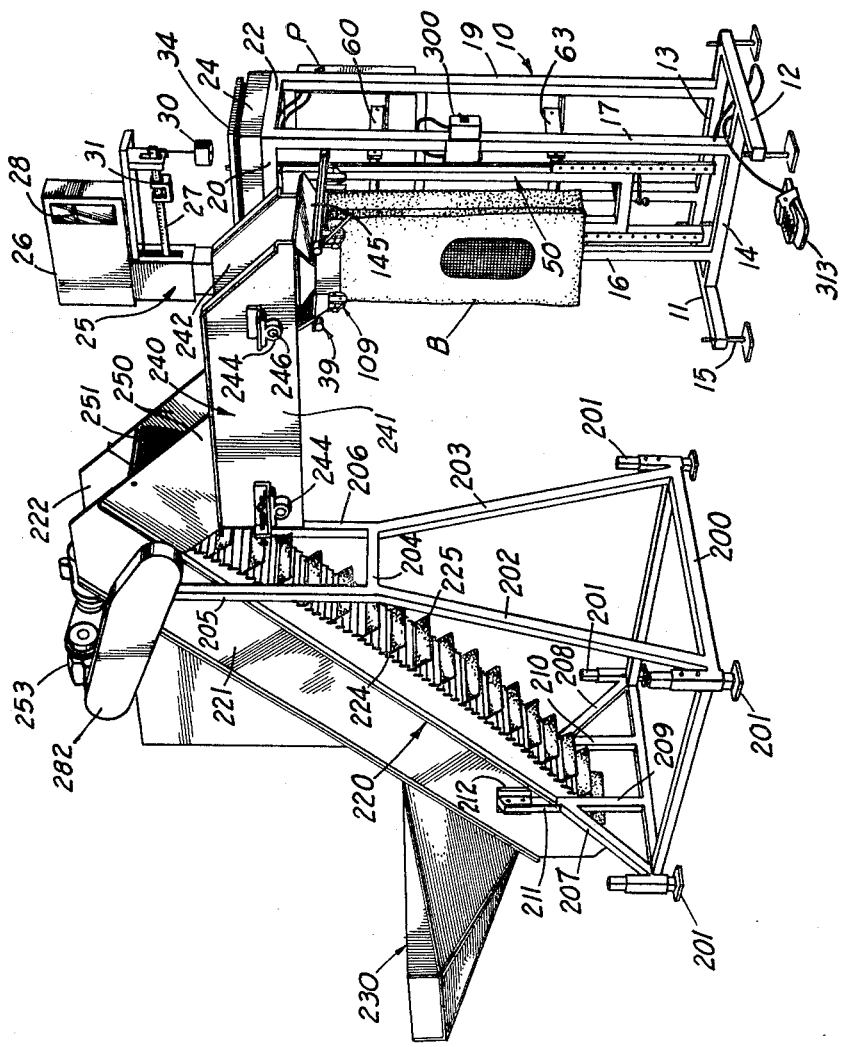
FIG. 1 is a perspective view of an automatic filling and weighing mechanism constructed in accordance with the present invention, a bag or receptacle being installed at the weighing station for receiving articles from the conveyor mechanism.

Referring now in detail to the embodiment chosen for the purpose of illustrating the present invention, numeral 10 denotes generally the upstanding stationary main frame of the weighing station. Main frame 10 includes a horizontal base frame having parallel forward and rearward end bars 11 and 12, the rear ends of which are connected by a transverse bar 13 and central portions of which are connected by a forward transverse bar 14. Adjustable feet 15 threadably engage end portions of the bars 11 and 12 so that the base frame (formed by the bars 11, 12, 13, and 14) may be supported on the floor and adjusted to a horizontal position. Extending upwardly from intermediate portions of the front bar 14 are a pair of parallel front support standards 16 and 17. In like manner, parallel rear-support standards 18 and 19 extend upwardly from intermediate portions of the back bar 13.

Figure 2:
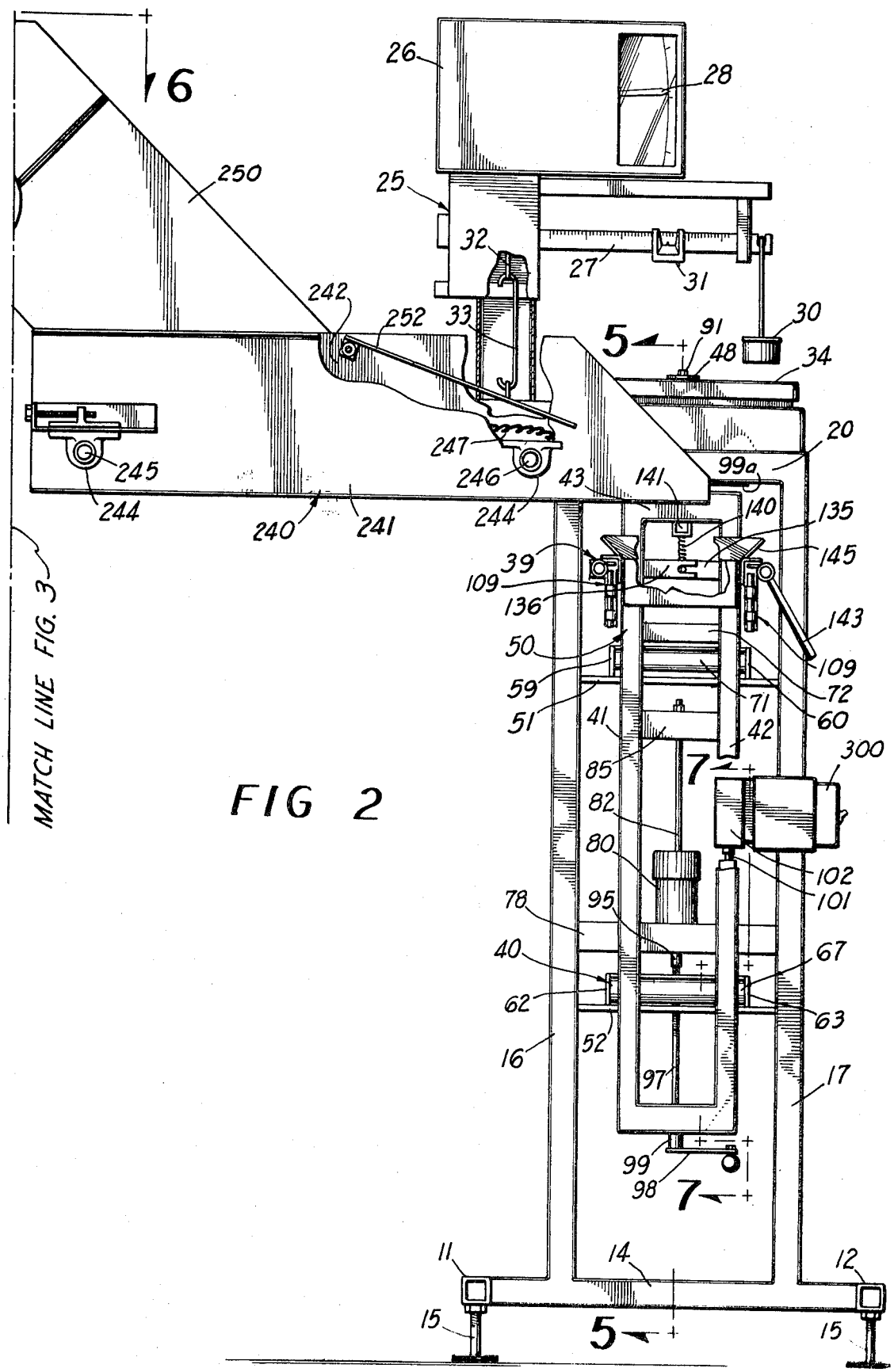
FIG. 2 is a enlarged front elevational view of the weighing station, (the bag removed therefrom) and the discharge end portion of the conveyor mechanism.

The upright standards 16, 17, 18, and 19 terminate in a common plane and are joined by a rectangular upper horizontal frame formed by angle iron bars, such as bars 20, 21 and 22. These angle irons 20, 21, 22 support a hollow scale base 24 of a conventional beam or scale which forms the trim or secondary weighing device, denoted generally by numeral 25. As best seen in FIGS. 1 and 2, the trim scale 25 includes a sensitive detector 26 and a indicator arm 28 connected in the customary way to the balance arm 27 of scale 25. Any movement of the balance arm 27 will be amplified by the detector 26 through vertical movement of wand or indicator arm 28 thereof. Movement of arm 28 will momentarily interrupt light from lamp L shining on a photo-electric cell 29 in the detector 26.

Suspended from one end of the balance arm 27 is the usual counterbalance weight 30 while the arm 27, itself carries a slidable counterbalance weight 31. The other end of the balance arm 27, as seen in FIG. 3, is provided with a dependent hook 32, connected by a link 33 to a conventional scale platform 34 supported on base 24.

It will be understood that, in the usual way, any downward movement of the scale platform 34 will cause downward movement of the link 33 and cause the balance arm 27 to be pivoted about its fulcrum when a prescribed weight is carried by the platform 34. This movement of arm 27 is amplified in movement of arm 28 and is detected by photo-electric cell 29.

RECEPTACLE SUSPENDING MECHANISM

Below the platform 34 is a receptacle suspending mechanism which includes a parallelogram stabilizing member, denoted generally by numeral 40, and a receptacle supporting member, the receptacle supporting member includes a vertically moveable frame 50 with a pair of receptacle supporting arms, denoted by numeral 39 extending forwardly therefrom, for the purpose of suspending the bag B, illustrated in FIG. 1. Frame 50 is a rectangular frame having a pair of parallel spaced vertically disposed struts 41 and 42 connected at their ends by cross-bars 43 and 44. Projecting inwardly from the central portion of the bottom cross-bar 44 is a horizontally disposed frame support arm 45. The vertical frame, formed by struts 41, 42 and bars 43, 44, is normally disposed within main frame 10, i.e., in about the same vertical plane with and within the rectangle formed by upright standards 16, 17 and bars 14 and 20.

The supporting arm 45 of the vertically moveable bag suspending frame 50 projects inwardly within the main frame 10, terminating in the central part of the frame 10, below the central part of the platform 34. A rigid tie rod arresting member 46 projects through an appropriate hole in the central portion of the platform 34 to terminate in the central part of the frame 10 with its lower end projecting through a hole in the free end of the support arm 45. The upper end of tie rod 46 is provided with an adjustment nut 47 riding upon a bearing plate 48 disposed on the upper surface of the platform 34. The lower end of the tie rod 46 is provided with an enlarged head 49 which provides a stop for the support arm 45. Hence, when the support arm 45 is riding upon the head 49, the weight of the vertically moveable bag or receptacle supporting frame 50 is carried by the tie rod 46.

The stabilizing member 40 includes two pairs of parallelogram arm assemblies between the main frame 10 and the frame 50. These arm assemblies include a pair of vertically spaced parallel horizontally disposed brackets 51 and 52. Inwardly of the ends of brackets 51 and 52 are angle members 53 and 54 which respectively carry cylindrical tubes 55 and 56, the ends of which are provided with bearings (not shown) through which opposed pairs of inwardly projecting pivot pins, such as pivot pins 57 and 58, extend.

Figure 5:
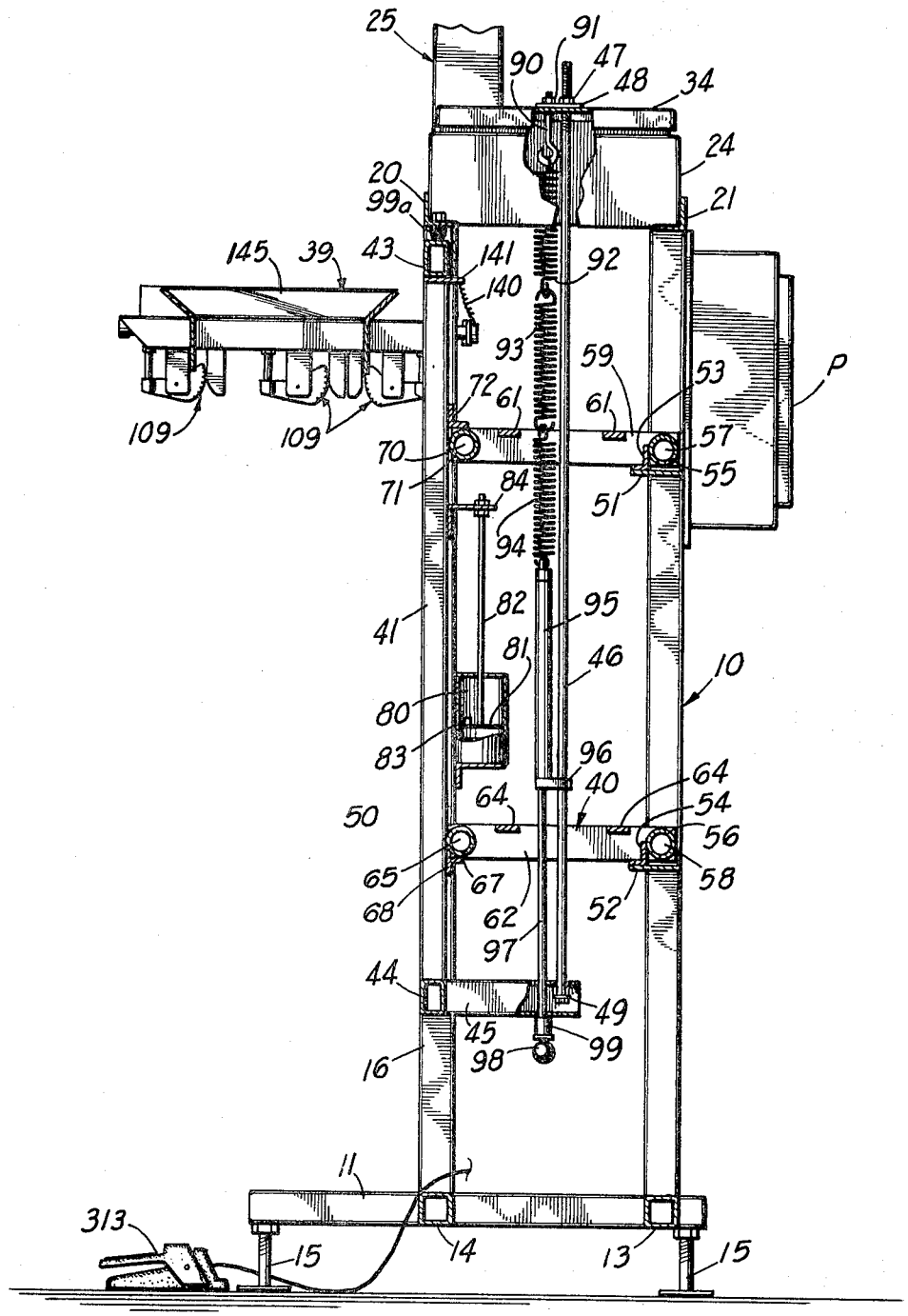
FIG. 5 is a cross-sectional view taken substantially along line 5—5 in FIG. 2.

The inward projecting upper pivot pins 57 are mounted on the inner end portions of the upper pivot arms 59 and 60, seen in FIGS. 5 and 1, respectively. These pivot arms 59 and 60 are disposed parallel to each other and extend forwardly to terminate adjacent the vertical frame 50. The pivot arms 59 and 60 are rigidly connected together by a pair of cross straps 61, seen in FIG. 5. In like manner, the bottom pivot arms 62 and 63 seen in FIGS. 5 and 1, respectively, are connected together by cross straps 64 and are respectively provided with the inwardly projecting pivot pins 58 journalled by tube 56.

The forward end portions of arms 62 and 63 are provided with inwardly projecting pivot pins, such as pivot pin 65 which are journalled, as best seen in FIG. 7, by bearings, such as bearing 66, in the ends of a tube 67. The tube 67 is mounted on a horizontally extended angle iron 68, the ends of which are secured to the inner surfaces of upright struts 41 and 42. In like manner, the arms 59 and 60 are provided with inwardly projecting pins, such as pin 70, seen in FIG. 5, which projects into a tube 71 supported by an angle iron 72 from the struts 41, 42 below and parallel to tube 67. Furthermore, the space between tubes 55 and 56 is approximately equal to the space between tubes 67 and 71.

Since the arms of 59, 60, 62 and 63 are of equal length and pivot at their ends about horizontal axes, and are disposed approximately horizontally, they maintain the vertical frame 50 in a vertical direction upwardly and downwardly through a limited distance sufficient to actuate the scale 25.

For preventing the photo-electric cell 29 from being tripped inadvertently, upon a surge of articles into the bag B, a dash pot mechanism, best seen in FIG. 5, is provided. This dash pot mechanism includes a dash pot cylinder 80 containing a piston 81 connected to a piston rod 82, the piston 81 having an orifice or valve 83. The cylinder 80 is mounted on the central portion of a transverse bracket 78, the ends of the bracket 78 being secured to the upright standards 16 and 17. The cylinder 80 is mounted in an upright position in the central portion of the bracket 78 so that the piston rod 82 projects upwardly and is secured to the struts 41 and 42 through an arm 84 secured to the central portion of a cross strap 85. Suitable fluid within the cylinder 80 permits only gradual movement of the rod 82 and hence prevents the oscillation or surging, as described above.

BULK WEIGHING MECHANISM

For providing a bulk weighing mechanism, or a primary weighing device, an adjustable spring member is arranged between the platform 34 and the support arm 45. In more detail, the spring member includes a hook 90 which depends from the central portion of the platform 34 and is supported by nut 91, riding on bearing plate 48, adjacent the tie rod nut 47. The hook 90, as best seen in FIG. 5, supports a plurality of tandem arranged springs 92, 93 and 94, the lower spring 94 being connected to an internally threaded sleeve 95 which is retained in parallel relationship to the tie rod 46 by means of a slide bar 96 on the lower end of the sleeve 95. For adjusting the tension on the springs 92, 93 and 94, an adjustment rod 97 projects upwardly through the support arm 45, the upper end portion of the adjustment rod 97 being provided with external threads which threadedly engage the internal threads of sleeve 95. At the lower end of the adjustment shaft 97 is a crank 98 by means of which the adjustment shaft 97 may be rotated. Upwardly of the crank 98 is a bearing 99 between the support arm 45 and the crank 98 so that the entire weight exerted on the arm 45 will be carried by the bearing 99 and transmitted to the adjustment shaft 97, when the arm 45 is not supported on the stop 49. Upward movement of the moveable frame 50 is arrested by a resilient or rubber bumper 99a carried by angle iron 20. With no load, the frame 50 normally rests against bumper 99a.

It will be understood that by manipulation of the crank 98, the effective length of the spring member can be varied so as to increase or decrease the tension on springs 92, 93, 94. Hence the weight necessary to move the frame 50 downwardly by a prescribed first distance can be varied as desired.

As best seen in FIG. 7, the frame 50, i.e., the strut 42 is provided with a rearwardly extending switch actuator arm 100 which, upon upward movement of frame 50, contacts a plunger 101 to actuate the switch 102. The function of switch 102 will be described in more detail hereinafter. The switch 102 is mounted by a plate 103 to the upright standard 17. With the frame 50 urged upwardly against bumper 99a, by springs 92, 93, 94, plunger 101 will be depressed sufficiently to throw switch 102. The arms 39 for supporting bag B are manually operated and, as illustrated in FIG. 9, include a pair of forwardly extending angle iron support arms 110 and 111 which are respectively secured by their proximal ends, in cantilever fashion, to struts 41 and 42. Below the arm 111 are a pair of bearings 112, 113 which support for rotation a shaft 114. Mounted on the shaft 114 between the bearings 112, 113 is a sleeve 115 from which projects an actuator plate 116. The sleeve 115 is secured to the shaft 114 for rotation therewith and, hence, rotation of shaft 114 will cause movement up and down in an arcuate path of the actuator plate 116.

Below the actuator plate 116 and secured to the vertical surface of arm 111 are a plurality of grippers, such as are illustrated in FIG. 8. Each gripper 109 is retained in place by bolts 117 which are threadedly received by the vertical part of the arms 111. Each gripper 109 includes an L-shaped body 118, one end of which slideably receives a plunger 119. The plunger 119 is internally threaded and receives a threaded extension shaft 120 therein. A lock nut 121 which is also received on the extension shaft 120 locks the extension shaft in any desired position and hence the effective length of the plunger 119 may be adjusted, as desired. The lower end of the extension 120 is received in a socket in the end of one arm of a bellcrank 123. The other end of the bellcrank 123 is provided with a cam 124 having teeth 125 disposed along its outer surface in an arcuate convex path. The bellcrank is pivotally carried by a transverse shaft 126 below the L-shaped body 118 by a pair of brackets 128, 129.

By such an arrangement, the teeth 125 are disposed in engagement with the vertical surface of the downwardly projecting post 130 of the body 118. The post 130 is essentially rectangular in cross-sectional shape and is provided with a beveled corner 131 adjacent to the cam 124. The bellcrank 123 is urged in a counterclockwise direction, as viewed in FIG. 8 by a spring 132 connected between the socket arm of the bellcrank and bracket 129. Hence, the cam 124 is yieldably urged into engagement with the post 130 for the purpose of clamping therebetween the upper edge portion of the sack or bag B. Of course, upon downward movement of the plunger 119, the bellcrank 123 will be thereby moved in a clockwise direction, as viewed in FIG. 8, so as to move the teeth 125 away from the post 130 and hence release the bag B.

It will be understood that the arm 110 is provided with a similar mechanism to the mechanism of arm 111, including a shaft 134 which is complementary to shaft 114 and disposed parallel thereto. Shaft 114 is rotatably carried by bearings such as bearing 132, seen in FIG. 9. The proximal ends of shafts 114 and 134 are respectively provided with inwardly projecting levers 135, 136 respectively. The end of a lever 135 is bifurcated at numeral 137 to provide a slot which receives a stub shaft 138, the stub shaft 138 being mounted on the end of lever 136. A roller 139 on stub shaft 138 is for the purpose of riding in slot 137.

A spring 140, connected by one end to the stub shaft 138, retains roller 139 in place. The other end of spring 140 is connected to a rearwardly projecting arm 141, seen in FIGS. 2 and 5, for continuously urging the levers 135 and 136 upwardly, so as to tend to pivot the actuator plates (such as plate 116) upwardly, out of engagement with the plungers (such as plunger 119). A manually operated bag release lever 143 is mounted on the free end of shaft 114 and, when pivoted upwardly, will cause simultaneous and opposite rotation to shafts 114, 134 so as to cause release of the bag B.

In the present embodiment each arm 110, 111 is provided with three bag retaining grippers 109, arranged successively along the length of the arm. The front pair of grippers 109 are always used for the purpose of mounting bag B by one side while either the second pair or the third pair of grippers 109 are used, depending upon the size of the bag B, which is adapted to receive articles from the conveyor mechanism to be described hereinafter. By suspending a bag B on the bag grippers 109, the chute 145 will direct all such articles into the bag B so suspended. By rotation of lever 145 in a counterclockwise direction as viewed in FIG. 2, all grippers 109 will simultaneously be caused to release the bag, due to the fact that the actuator plates, such as plate 116, will strike all plungers 119, thereby causing simultaneous rotation of all bellcranks 123 so as to withdraw the cam 124 from its abutting surface.

CONVEYOR ASSEMBLY

The conveyor assembly of the present invention, as seen in FIG. 1, includes a supporting frame having a flat rectangular frame base 200 provided with adjustable feet 201 and upstanding legs 202 and 203 at the inner ends of base 200. The upper ends of legs 202 and 203 are joined by a cross bar 204 while a pair of upstanding support arms 205 and 206 project upwardly from the ends of support legs 202 and 203 to provide support for the intermediate part of the conveyor mechanism.

In a similar manner the support frame includes, at the input end of base 200, a pair of converging support legs 207, 208 and a pair of upright support legs 209 and 210, the legs 207 and 209 intersecting at their upper ends to provide for an upstanding arm 211. The legs 208 and 210 provide support for an upstanding arm (not shown). The arms, such as arm 211 support the lower input end of the input conveyor assembly 220 by means of an angle iron 212, while the arms 205 and 206 support the discharge end of the upwardly inclined infeed conveyor mechanism 220.

In more detail the infeed conveyor mechanism 220 includes a pair of upwardly inclined opposed parallel side plates 221 and 222 which are joined by spaced transverse bars 223 to form a channel. The upper flight of an endless conveyor 224 passes over the bars 23 and is provided with outwardly projecting spaced paddles 225. The endless conveyor 224 is carried by a lower adjustable shaft 226, seen in FIG. 4 and an upper drive shaft 227, seen in FIG. 3.

The lower end portion of the conveyor mechanism 220 is provided with a hopper 230 so that articles, such as potatoes, may be dumped into the hopper 230 and picked up by the conveyor 223. This hopper 230 includes opposed sides such as side 231 and inclined bottom plate 232, seen in FIG. 4. The bottom plate 232 is provided with flanges, such as flange 233, by means of which the bottom plate 232 is secured against sides 221 and 222. The inner end of bottom plate 232 is bent rearwardly and downwardly to provide a protector plate 234, beneath which the paddles 225 pass.

The articles received in the hopper 230 are directed by the plate 232 toward the conveyor 223 where the paddles 225 lift the same in an upwardly inclined direction to the end of the conveyor. At this time, the articles are dumped or dropped onto a cross feed conveyor mechanism, denoted generally by numeral 240. The conveyor mechanism 240 includes a U-shaped trough or channel having sides 241, 242 and connecting transverse bars 243. Pillow blocks 244 carried by the sides 241 and 242 support a pair of transverse shafts 245 and 246 around which passes the endless horizontal conveyor 247.

For supporting the conveyor mechanism 240 in cantilever fashion, so that it receives articles by gravity from the end of conveyor 224 and discharges the same into chute 145 and thence into bag B, a pair of opposed side plates 250 extend downwardly and forwardly from forward lower edges of sides 221 and 222, respectively, and are secured to upper end portions of sides 241 and 242, respectively.

An appropriate baffle 251 across side plates 250 prevents the conveyor 224 from throwing the articles outwardly beyond the end of conveyor 224, while an appropriate baffle 252, disposed between sides 241 and 242 prevents articles from being inadvertently discharged from the conveyor 247.

For the purpose of driving the two conveyors 224 and 247 simultaneously the conveyor 247 being driven at a slightly faster speed than conveyor 224, a gear reducer 253, seen in FIG. 3, is mounted on a platform 254, supported by upstanding side members 255 from the sides 221 and 222. This gear reducer 253 has an output shaft 256 carrying a drive sprocket 257 which drives a continuous chain 258, the chain 258 passing over a sprocket 259 on shaft 227. An idler sprocket 260 urges the chain 258 into a tightened condition. The shaft 256 on the gear reducer 253 is driven by an input shaft 261 which projects through and outwardly of the gear reducer on both sides. Shaft 261 is provided, on one side, with a first electrical magnetic clutch 262 and on the opposite side with a second electrical magnetic clutch 263.

A low speed motor 264 drives, through a variable speed sheave 265 on the end of the motor, a belt 266, around the clutch 262. In like manner, a high speed motor 270 drives through a variable speed sheave 271, a belt 272 which drives the clutch 263. Hence with clutch 262 energized, the low speed motor 264 drives sprocket 257 at low speed while, with these clutch 262 deenergized and the clutch 263 energized, the same sprocket 257 will be driven at high speed.

The shaft 227 which is driven by the sprocket 259 also carries a sprocket 274, seen in FIG. 6. The sprocket 274 drives, through chain 275, a sprocket 276 on shaft 244. Hence, the travel of conveyors 224 and 274 are, at all times, synchronized so that conveyor 247 is slightly faster than conveyor 224.

As seen in FIG. 6, runners 280 and 281 are disposed beneath the respective conveyors 224 and 247. Furthermore, the chains 258 and 275 are covered with appropriate covers 282 and 283 respectively.

ELECTRICAL CIRCUITRY

Figure 10:
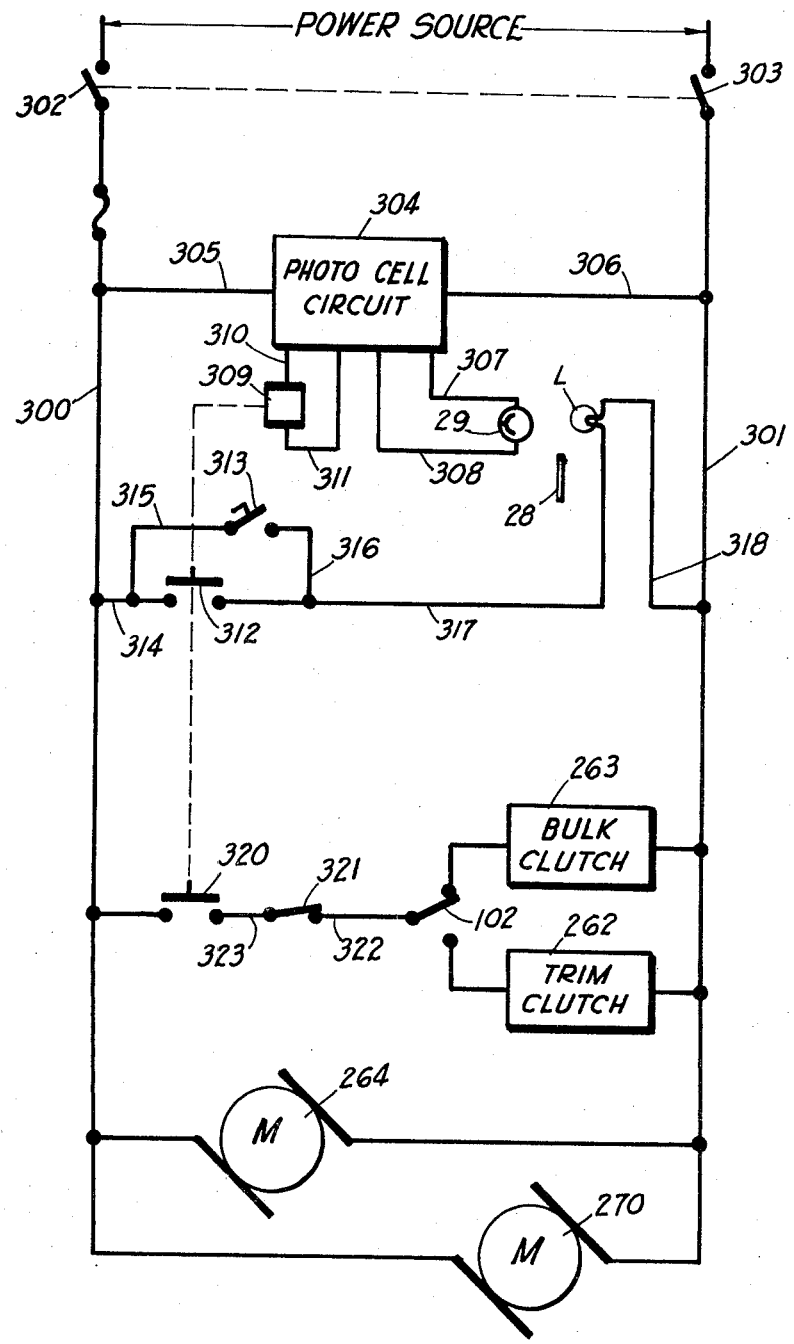
FIG. 10 is a wiring diagram of the electrical circuitry of the mechanism illustrated in FIG. 1.

Referring specifically to FIG. 10, it will be seen that the electrical circuitry includes a hot wire 300 and a ground wire 301 leading from a source of electricity through appropriate on-off switches 302 and 303. Across this circuit from wire 300 to wire 301 is a photo-electric cell circuit 304, the photo-electric cell circuit being connected to wire 300 by wire 305 and to wire 301 by wire 306. The photo-electric circuit 304 is conventional in construction and hence the details thereof are not disclosed in this specification. Suffice it to state that the photo-electric cell 29 is connected into the circuit by wires 307 and 308 and the coil of a relay is connected to this circuit 304 by wires 310 and 311. The circuit 304 is so constructed and arranged that the coil 309 is energized from the power source when switches 302 and 303 are closed, provided light is shining upon the photo-eletcric cell 29. When no light or insufficient light is shining upon photo-electric cell 29, the coil 309 is deenergized.

As pointed out above lamp L is carried by the casing of the detector 26 on a side opposite the side carrying the photo-electric cell 29 so that, as the arm or wand 28 of detector 26 begins its travel upwardly, it will momentarily interrupt the shining of the light from lamp L upon the photo-electric cell 29. The energizing of light L is selectively controlled by a pair of normally opened switches, one switch being the relay switch 312 which is controlled by the coil 309 of the relay, and the other switch being a foot actuated switch 313, seen in both FIGS. 1 and 10.

The switches 312 and 313 are disposed in parallel across the line but in series with lamp L the wires 314, 315, 316, 317 and 318 accomplish this.

It is now seen that through the use of the coil 309 and switch 312, a holddown relay situation is provided in which, once the switch 313 is depressed momentarily, a circuit is created to the lamp so as to light the same and the light shines upon the photo-electric cell 29 so as to energize the coil 309, thereby closing switch 312. Once this has been accomplished, the switch 313 is rendered inoperative until coil 309 is deenergized. Hence, by depressing switch 313 the photo-electric circuit is rendered operative so as to detect when the arm 28 interrupts the light shining from lamp L onto photo-electric cell 29. This interruption, as pointed out above, can be momentary and yet deenergize the coil 309 sufficiently to permit switch 312 to return to its open position.

It is now seen that through the use of the coil 309 and switch 312, a hold down relay situation is provided in which, once the switch 313 is depressed momentarily, a circuit is created to the lamp so as to light the same and the light shines upon the photo-electric cell 29 so as to energize the coil 309, thereby closing switch 312. Once this has been accomplished, the switch 313 is rendered inoperative until coil 309 is deenergized. Hence, by depressing switch 313 the photo-electric circuit is rendered operative so as to detect when the arm 28 interrupts the light shining from lamp L onto photo-electric cell 29. This interruption, as pointed out above, can be momentary and yet deenergize the coil 309 sufficiently to permit switch 312 to return to its open position.

Controlled by the relay, i.e. the coil 309, is a second normally opened switch 320 which switch is disposed in series with a normally closed cycle stop switch 321. The function of switch 313 is to start the cycle and the function of switch 321 is to stop the cycle.

In series with the switches 320 and 321 is the control switch 102, seen best in FIGS. 7 and 10. This switch 102 is a single poled double throw switch, the arm of which is connected via wire 322 to switch 321 and thence through wire 323 and switch 320 to the hot side 300. The normally closed terminal of switch 102 is connected to the trim clutch 262 and to ground 301 while the normally opened terminal is connected via the bulk clutch 263 to ground 300.

It will be remembered that switch 201 is normally depressed, due to the contact of arm 100 with the actuator or plunger 101, seen in FIG. 7. Hence, in FIG. 10, the arm of switch 102 is illustrated as being connected to the bulk clutch so as to provide a circuit, initially, to energize the bulk clutch 263.

Of course, once the arm 100 is lowered only a short distance, it clears the plunger 101 and permits the spring loading of switch 102 to return the same to a position connecting it to the trim clutch 262.

In FIG. 10, it will be seen that the motors 264 and 270 are connected across the circuit of wires 300, 301. Thus, when the on-off switches 302, 303 are closed, the motors 264 and 270 are energized throughout the entire time that the apparatus is utilized.

OPERATION

From the foregoing description, the operation of the present apparatus should be apparent. First, the on-off switches 302, 303 should be closed so as to provide current to the machine. This starts motors 264 and 270; however, since neither the bulk clutch 265 nor the trim clutch 271 are energized, the conveyor is not driven. Therefore no articles are delivered by the conveyor.

The operator, after installing a bag in position on the grippers 109 for receiving the articles, momentarily depresses the foot switch 313. This is all that is necessary in order to operate the mechanism. The momentary depressing switch 313 creates a circuit to lamp L thereby lighting this lamp. Light from lamp L shines on the photoelectric cell 29 which causes coil 309 to be energized. The energizing of coil 309 simultaneously closes switches 312 and 320.

The switch 312 is a hold down switch which takes over from switch 313 to continue to supply current so that lamp L remains lighted, so long as the coil 309 is energized. Furthermore, this maintains switch 320 in a closed condition. Since switch 321 is normally closed, and switch 102 is connected to the bulk clutch 263, motor 264 is now engaged with the conveyor system. This causes the conveyor system to be driven at a relatively rapid rate so as to feed a pre-set amount of articles to the bag B suspended by the grippers 109. Usually approximately 90% of the prescribed weight is fed by the conveyor during the period in which the bulk clutch 263 is energized. When a prescribed amount of weight has been received by the bag B, it extends the springs 93, 94 and 95 (seen in FIG. 5) a first distance so that the arm 100 (seen in FIG. 7) is lowered away from the plunger 101 to permit the throwing of the switch 102 to provide a first signal so as to break the circuit to the bulk clutch 263 and make the circuit to the trim clutch 262. Thus, the motor 270 is disengaged from driving the conveyor and the motor 264 is engaged for driving the conveyor. This motor 264, of course, drives the conveyor at a relatively low rate of speed for feeding the final articles quite slowly to the bag B.

It will be understood that once the springs 93, 94, and 95 are extended, a prescribed distance, support arm 45 engages head 49 so that, during the remainder of the cycle, the receptacle supporting member 50 is carried by platform 34, as if springs 92, 93, 94 were not there.

When the final weight of the bag B is achieved, arm 45 through rod 46 moves platform 34, downwardly. Hence, the arm 28 moves upwardly between the lamp L and the photo-electric cell 29 so as to momentarily interrupt the light shining on the photo-electric cell. This, as pointed out above, causes coil 309 to be deenergized for a sufficient period of time to permit the opening of switches 312 and 320. Since switch 313 is returned to its opened position, the opening of switch 312 causes the current to lamp L to be interrupted and so the lamp L become dark. The opening of switch 320 interrupts the current to both the bulk clutch 263 and trim clutch 262 and this stops the feeding of the conveyor.

Thereafter, by rotating the lever 143, the operator can cause the bag B to be dropped from the grippers 109.

Usually a conveyor (not shown) removes the bag B after the same has been dropped and a subsequent bag can then be installed for a second operation. After the second bag is installed, the filling and weighing operation is repeated simply by the depression of switches 313.

If it is desired to change the final weight of bag B, counterblalance weights 30 and 31 are manipulated in the usualy way for the scale. If the bulk weight is to be changed, crank 98 is manipulated.

I claim:
1. Automatic filling and weighing mechanism comprising:
   a main frame;
   a weighing mechanism in a prescribed weighing zone on said main frame, said weighing mechanism including:
      a primary weighing device for weighing a first prescribed weight and for providing a first signal when the first prescribed weight is attained; and,
      a secondary weighing device for weighing a second prescribed weight of greater amount than said first prescribed weight, said secondary weighing device providing a second signal when the second prescribed weight is attained;
   a receptacle supporting member in said weighing zone and connected to said weighing mechanism for supporting a receptacle in a generally laterally immovable open position in said weighing zone for receiving articles therein and being moveable essentially only in a vertical path through a first distance for actuating said primary weighing device, to provide said first signal, said receptacle supporting member being moveable through a second distance for actuating said secondary weighing device to provide said second signal; and
   feed means operable to feed the total demand of articles in a single prescribed path to said receptacle in said weighing zone, said feed means being responsive to said first signal to reduce the rate of feeding of said articles and responsive to said second signal for stopping the feeding of said articles to said receptacle.

2. The automatic filling and weighing mechanism of claim 1 wherein said feed means includes:
   a conveyor for delivering said articles to said receptacle when said conveyor is driven;
   drive means for selectively driving said conveyor at a relatively high rate of delivery of said articles and for driving said conveyor at a relatively low rate of delivery of said articles; and
   means interconnecting said weighing mechanism and said drive means for permitting the signals from said weighing mechanism to control said drive means so that, when said drive means is actuated, said drive means drives said conveyor at said relatively high rate until said first signal is provided, and, thereafter, at said relatively low rate until said second signal is provided, at which time said drive means is to stop said conveyor.

3. The automatic filling and weighing mechanism of claim 1 wherein said feed means includes a conveyor having a discharge end over the open receptacle which is carried by said receptacle supporting member, a pair of motors for driving said conveyor and clutch means between said motors and said conveyor for selectively engaging one of said motors with said conveyor while disengaging the other of said motors from said conveyor and vice versa, and wherein said primary weighing means includes an electrical switch controlled by the position of said receptacle supporting member for controlling said clutch means.

4. The automatic filling and weighing mechanism of claim 1 wherein said receptacle supporting member includes a movable frame and a plurality of pivot arms disposed in spaced approximately parallel relationship to each other, each of said pivot arms being pivotally connected by their inner ends to said main frame along horizontal axes and by their outer ends to said moveable frame, a pair of spaced outwardly projecting arms on said moveable frame, and grippers on said outwardly projecting arms for gripping the receptacle by its upper edge portions.

5. The automatic filling and weighing mechanism of claim 1 wherein said primary weighing device includes a spring member having an elongatable spring and means for varying the effective length of said spring, and said secondary weighing device includes a scale, said spring member depending from said scale and being connected to said receptacle supporting member for initially supporting said receptacle supporting member, and a rigid arresting member connected between said scale and said receptacle supporting member for limiting the amount of elongation of said spring member.

6. The automatic filling and weighing mechanism of claim 1 wherein said receptacle supporting member includes a vertically disposed frame and a pair of receptacle supporting arms extending therefrom a plurality of grippers carried by said arms and interconnected for simultaneous clamping and releasing action, spring means for urging all grippers to a clamping position for engaging and holding the upper edge portion of said receptacle, and a hand operated lever for operating all of said grippers to release its clamping action.

7. The automatic filling and weighing mechanism of claim 1 including an electrical circuitry from a source of power and wherein said primary weighing device includes a first switch for providing said first signal, said switch being mounted on said main frame and being moveable from its normal position to an actuated position by the movement downwardly by a prescribed amount of said receptacle supporting member, said secondary weighing device including a wand moveable to provide said second signal, said feed means including a conveyor, a primary drive motor for driving said conveyor at a fast rate of delivery and a secondary drive motor for driving said conveyor at a low rate of delivery, said electrical circuitry including a circuit across said source of power through said first switch for actuating the primary drive motor when said first switch is in its normal position and for actuating said secondary drive motor when said first switch is in an actuated condition, a second switch, a photo-electric cell on one side of said wand, a source of light shining on said photo-electric cell and interrupted by said wand when the same is moved, a second switch in said circuit and controlled by said photo-electric cell for interrupting current flowing in said circuit when said light is interrupted, a photo-electric cell circuit across said source of power and third switch means in said photo-electric cell circuit to program said photo-electric cell to actuate said second switch.

8. The automatic filling and weighing mechanism of claim 1 wherein said primary weighing device includes spring for supporting said receptacle supporting member, said spring being progressively elongated as weight is added to the receptacle as said receptacle supporting member is moved through said first distance and wherein said secondary weighing device includes a scale from which said receptacle supporting member is suspended during that portion of the time that receptacle supporting member is moved through said second distance.

9. The automatic filling and weighing mechanism of claim 8 wherein said spring is suspended from said scale and including a rigid arresting member carried by said scale for limiting the elongation of said spring with respect to said scale.

10. Method of filling and weighing a receptacle comprising:
suspending said receptacle in an elevated position, from a pair of weighing devices set for activation when different weights are attained, directing articles along a prescribed path into said receptacle during a first period at a high rate of delivery until one of said weighing devices is actuated and then along the same path at a relatively low rate of delivery during a second period until the second of said weighing devices is actuated, and interrupting the feeding of said articles along said path when said second weighing device is actuated.

11. The method set forth in claim 10 wherein said receptacle is a bag and is suspended in an upright open position by spaced edge portions adjacent its mouth.

12. The method set forth in claim 10 wherein said articles are fed successively along an upwardly inclined path and dropped, and thereafter fed along a horizontal path to a position over said receptacle whereat the articles are successively fed by gravity into said receptacle.

References Cited

UNITED STATES PATENTS

| 3,416,620 | 12/1968 | McClusky | 177—123 |
| 1,603,274 | 10/1926 | Gammel | 177—123 X |
| 3,073,399 | 1/1963 | Durand | 177—122 X |
| 3,416,619 | 12/1968 | McClusky | 177—53 |

RICHARD B. WILKINSON, Primary Examiner

G. H. MILLER, JR., Assistant Examiner

U.S. Cl. X.R.

177—122, 160